US012281785B2

(12) United States Patent
Niemiec et al.

(10) Patent No.: US 12,281,785 B2
(45) Date of Patent: Apr. 22, 2025

(54) COMBINATION LED LIGHTING AND FAN APPARATUS

(71) Applicants: Darrin W. Niemiec, Schaumburg, IL (US); William J. Carlson, Schaumburg, IL (US)

(72) Inventors: Darrin W. Niemiec, Schaumburg, IL (US); William J. Carlson, Schaumburg, IL (US)

(73) Assignee: Go Fan Yourself, LLC, Long Grove, IL (US)

( * ) Notice: Subject to any disclaimer, the term of this patent is extended or adjusted under 35 U.S.C. 154(b) by 0 days.

(21) Appl. No.: 18/122,232

(22) Filed: Mar. 16, 2023

(65) Prior Publication Data

US 2023/0220981 A1 Jul. 13, 2023

Related U.S. Application Data

(63) Continuation of application No. 17/492,778, filed on Oct. 4, 2021, now Pat. No. 11,608,974, which is a (Continued)

(51) Int. Cl.

*F21V 29/67* (2015.01)
*F21V 3/00* (2015.01)

(Continued)

(52) U.S. Cl.

CPC .............. *F21V 29/673* (2015.01); *F21V 3/00* (2013.01); *F21V 3/049* (2013.01); *F21V 29/61* (2015.01); *F21V 29/677* (2015.01); *F21V 33/0092* (2013.01); *F24F 7/007* (2013.01); *F21S 8/026* (2013.01); *F21V 5/02* (2013.01);

(Continued)

(58) Field of Classification Search

CPC ....... F21V 29/673; F21V 29/677; F21S 8/026
See application file for complete search history.

(56) References Cited

U.S. PATENT DOCUMENTS

| | | |
|---|---|---|
| 3,670,193 A | 6/1972 | Thorington et al. |
| 3,992,646 A | 11/1976 | Corth |

(Continued)

FOREIGN PATENT DOCUMENTS

| | | |
|---|---|---|
| CA | 2856725 | 6/2013 |
| CN | 201797809 | 4/2011 |

(Continued)

OTHER PUBLICATIONS

Argyroudi-Akoyunoglou et al., "Photoinduced Changes in the Chlorophyll a to Chlorophyll b Ratio in Young Bean Plants," Plant Physiology, Aug. 1970, 46(2), pp. 247-249.

(Continued)

*Primary Examiner* — Karabi Guharay
(74) *Attorney, Agent, or Firm* — Vitale Vickrey Niro Solon & Gasey LLP

(57) ABSTRACT

A combination axial fan and LED lighting system configured to fit into the footprint of a standard ceiling tile. The system includes a housing container and an axial fan. The fan has a fan cavity including air diversion mechanism to direct air from the fan cavity toward the lighting and fan components. The invention includes an airflow surface to direct air existing the fan cavity along an LED light fixture.

18 Claims, 12 Drawing Sheets

Related U.S. Application Data continuation of application No. 16/460,217, filed on Jul. 2, 2019, now Pat. No. 11,137,134, which is a continuation of application No. 15/991,038, filed on May 29, 2018, now Pat. No. 10,337,716, which is a continuation of application No. 15/471,762, filed on Mar. 28, 2017, now Pat. No. 10,006,619.

(60) Provisional application No. 62/439,719, filed on Dec. 28, 2016.

(51) Int. Cl.

| | |
|---|---|
| ***F21V 3/04*** | (2018.01) |
| ***F21V 29/61*** | (2015.01) |
| ***F21V 33/00*** | (2006.01) |
| ***F24F 7/007*** | (2006.01) |
| *F21S 8/02* | (2006.01) |
| *F21V 5/02* | (2006.01) |
| *F21V 9/08* | (2018.01) |
| *F21V 29/508* | (2015.01) |
| *F21V 29/83* | (2015.01) |
| *F21Y 103/10* | (2016.01) |
| *F21Y 113/00* | (2016.01) |
| *F21Y 115/10* | (2016.01) |

(52) U.S. Cl.

CPC ............... *F21V 9/08* (2013.01); *F21V 29/508* (2015.01); *F21V 29/83* (2015.01); *F21Y 2103/10* (2016.08); *F21Y 2113/00* (2013.01); *F21Y 2115/10* (2016.08); *F24F 2221/02* (2013.01); *F24F 2221/14* (2013.01)

(56) References Cited

U.S. PATENT DOCUMENTS 5,012,609 A 5/1991 Ignatius et al.
5,278,432 A 1/1994 Ignatius et al.
6,242,752 B1 6/2001 Soma et al.
6,497,840 B1 * 12/2002 Palestro .................... A61L 9/20 422/4
6,791,259 B1 9/2004 Stokes et al.
7,607,935 B2 10/2009 Dahl
7,658,891 B1 2/2010 Barnes
7,922,351 B2 4/2011 Welker
8,074,397 B2 12/2011 Yoneda
8,297,782 B2 10/2012 Bafetti
8,302,346 B2 11/2012 Hunt et al.
8,350,228 B2 1/2013 Welker
8,398,264 B2 3/2013 Anderson
8,439,517 B2 5/2013 Welker
8,453,376 B2 6/2013 Chen
8,476,844 B2 7/2013 Hancock et al.
8,508,204 B2 8/2013 Deurenbeg et al.
8,844,608 B2 9/2014 Kimura
9,039,966 B2 5/2015 Anderson et al.
9,046,227 B2 6/2015 Aurelien
9,145,590 B2 9/2015 Evans et al.
9,162,077 B2 10/2015 Nigola et al.
9,333,274 B2 5/2016 Peterson
9,368,695 B2 6/2016 Aurelien
9,439,989 B2 9/2016 Lalicki
9,581,310 B2 2/2017 Wu et al.
9,681,515 B2 6/2017 Rantala
9,737,842 B2 8/2017 Matlin
9,750,105 B2 8/2017 Rantala
9,938,165 B2 4/2018 Taghipour
10,006,619 B1 6/2018 Niemiec
10,104,740 B2 10/2018 Rantala
10,221,857 B2 3/2019 Niemiec
10,247,191 B2 4/2019 Niemiec
10,316,141 B2 6/2019 Niemiec
10,337,716 B2 7/2019 Niemiec
10,393,357 B2 8/2019 Niemiec
10,398,000 B2 8/2019 Rantala
10,440,900 B1 10/2019 Higgins
10,670,026 B2 6/2020 Niemiec
11,028,223 B2 6/2021 Niemiec
11,060,712 B2 7/2021 Niemiec
11,137,134 B2 10/2021 Niemiec
11,332,573 B2 5/2022 Niemiec
2003/0124023 A1 7/2003 Burgess et al.
2004/0008523 A1 1/2004 Butler
2005/0055070 A1 3/2005 Jones et al.
2005/0207159 A1 9/2005 Maxik
2006/0022582 A1 2/2006 Radkov
2006/0071589 A1 4/2006 Radkov
2006/0186377 A1 8/2006 Takahashi et al.
2006/0261742 A1 11/2006 Ng et al.
2006/0262545 A1 11/2006 Piepgras et al.
2006/0284199 A1 12/2006 Matheson
2008/0008620 A1 1/2008 Alexiadis
2008/0245788 A1 10/2008 Choong et al.
2008/0278927 A1 11/2008 Li et al.
2008/0305004 A1 12/2008 Anderson et al.
2008/0315217 A1 12/2008 Van Der Wel
2009/0018621 A1 1/2009 Vogler et al.
2009/0034236 A1 2/2009 Reuben
2009/0231832 A1 9/2009 Zukauskas et al.
2009/0267484 A1 10/2009 Kasakura et al.
2010/0001648 A1 1/2010 De Clercq et al.
2010/0121420 A1 5/2010 Fiset et al.
2010/0232135 A1 9/2010 Munehiro et al.
2010/0244724 A1 9/2010 Jacobs et al.
2010/0246169 A1 9/2010 Anderson et al.
2011/0315956 A1 12/2011 Tischler et al.
2012/0068615 A1 3/2012 Duong et al.
2012/0099303 A1 4/2012 Li et al.
2012/0281408 A1 11/2012 Owen et al.
2012/0286304 A1 11/2012 LeToquin et al.
2012/0320607 A1 12/2012 Kinomoto et al.
2012/0326610 A1 12/2012 Lawyer
2013/0077299 A1 3/2013 Hussell et al.
2013/0139437 A1 6/2013 Maxik
2013/0194795 A1 8/2013 Onaka
2013/0313516 A1 11/2013 David et al.
2013/0313546 A1 11/2013 Yu
2013/0318869 A1 12/2013 Aikala
2013/0320299 A1 12/2013 Li
2014/0009064 A1 1/2014 Kornitz
2014/0034991 A1 2/2014 McKenzie et al.
2014/0152194 A1 6/2014 Beyer
2014/0254131 A1 9/2014 Osinski et al.
2014/0328046 A1 11/2014 Aanegola et al.
2015/0014715 A1 1/2015 Hsing Chen et al.
2015/0049459 A1 2/2015 Peeters et al.
2015/0083221 A1 3/2015 Boonekamp et al.
2015/0129781 A1 5/2015 Kretschmann
2015/0182646 A1 7/2015 Anderson et al.
2015/0196002 A1 7/2015 Friesth
2015/0342125 A1 12/2015 Krijn et al.
2016/0015840 A1 1/2016 Gordon
2016/0030610 A1 2/2016 Peterson et al.
2016/0088802 A1 3/2016 Nicole et al.
2016/0249810 A1 9/2016 Darty et al.
2016/0271281 A1 9/2016 Clynne et al.
2016/0273717 A1 9/2016 Krames et al.
2016/0276550 A1 9/2016 David et al.
2016/0375161 A1 12/2016 Hawkins et al.
2016/0375162 A1 12/2016 Marry et al.
2016/0375163 A1 12/2016 Hawkins et al.
2017/0014538 A1 1/2017 Rantala
2018/0119973 A1 5/2018 Rothman et al.
2018/0147417 A1 5/2018 Rantala
2018/0224093 A1 8/2018 Dutta et al.
2018/0347574 A1 * 12/2018 Niemiec ................. F21S 10/06
2019/0072288 A1 * 3/2019 Niemiec ................... E04B 9/02
2019/0113219 A1 4/2019 Niemiec et al.
2019/0292315 A1 9/2019 Niemiec et al.
2019/0323696 A1 * 10/2019 Niemiec ................. F21V 29/61
2020/0009286 A1 1/2020 Zarcone et al.
2020/0038542 A1 2/2020 Franklin

(56) References Cited

U.S. PATENT DOCUMENTS

| | | | | |
|---|---|---|---|---|
| 2020/0288646 | A1 | 9/2020 | Howe | |
| 2023/0061420 | A1 | 3/2023 | Higgins | |
| 2023/0119976 | A1 | 4/2023 | Maletich | |
| 2023/0349544 | A1 * | 11/2023 | Niemiec | F21V 3/049 |
| 2023/0366570 | A1 | 11/2023 | Maletich | |

FOREIGN PATENT DOCUMENTS

| | | |
|---|---|---|
| CN | 103947469 | 7/2014 |
| CN | 103947470 | 7/2014 |
| CN | 104056289 | 9/2014 |
| CN | 107661532 | 2/2018 |
| CN | 109827261 | 5/2019 |
| CN | 111494695 | 8/2020 |
| CN | 112057662 | 12/2020 |
| EP | 2554583 | 2/2013 |
| JP | S6420034 | 1/1989 |
| JP | 2003339845 | 12/2003 |
| KR | 1020130125436 | 11/2013 |
| KR | 1020170114678 | 10/2017 |
| KR | 102042655 | 11/2019 |
| WO | 2001/014012 | 3/2001 |
| WO | 2002/067660 | 9/2002 |
| WO | 2003/063902 | 8/2003 |
| WO | 2004/033028 | 4/2004 |
| WO | 2006/100303 | 9/2006 |
| WO | 2006/126482 | 11/2006 |
| WO | 2007/012875 | 2/2007 |
| WO | 2007/049180 | 5/2007 |
| WO | 2009/045107 | 4/2009 |
| WO | 2009/056838 | 5/2009 |
| WO | 2013/141824 | 9/2013 |
| WO | 2014/188303 | 11/2014 |
| WO | 2015/066099 | 5/2015 |
| WO | 2016/019029 | 2/2016 |
| WO | 2018/221505 | 12/2018 |

OTHER PUBLICATIONS

Beelmann et al., "Post-harvest Vitamin D Enrichment of Fresh Mushrooms," HAL Project # MU07018, Apr. 30, 2009, Penn State University.

Carvalho et al., "Sequential Light Programs Shape Kale (Brassica Napus) Sprout Appearance and Alter Metabolic and Nutrient Content," Horticulture Research 1, Article No. 8, 2014.

Eytan et al., "Changes in Photosystem I Activity and Membrane Organization During Degreening and Greening of a Chlamydomon as Reinhardi Mutant, y-1," The Journal of Biological Chemistry, vol. 249, No. 3, Issue of Feb. 10, , p. 738-744, 1974.

Kleuter et al., "Photosynthesis in Cucumbers with Pulsed or Continuous Light," Transactions of the ASABE, 23(2): 0437-0442, 1980.

Lefsrud et al., "Irradiance from Distinct Wavelength Light-Emitting Diodes Affect Secondary Metabolites in Kale," HortScience, vol. 43, No. 7, pp. 2243-2244, 2008.

Nicklisch, Andreas, "Growth and Light Absorption of Some Planktonic Cyanobacteria, Diatoms and Chlorophyceae Under Stimulated Natural Light Fluctuations," Journal of Plankton Research, vol. 20, Issue 1, pp. 105-119, 1998.

Olle et al., "The Effects of Light-Emitting Diode Lighting on Greenhouse Plant Growth and Quality," Agricultural and Food Science, vol. 22, No. 2, pp. 223-234, 2013.

Sforza et al., "Adjusted Light and Dark Cycles Can Optimize Photosynthetic Efficiency in Algae Growing in Photobioreactors," PLos ONE, 7(6): e38975, 2012.

Tennessen et al. "Efficiency of Photosynthesis in Continuous and Pulsed Light Emitting Diode Irradiation," Photosynthesis Research, 44(3), pp. 261-269, 1995.

Vänninen et al. "Prospecting the Use of Artificial Lighting for Integrated Pest Management," ISHS Acta Horticulturae, 956, pp. 593-608, 2010.

Yeh et al., "High-Brightness LEDs—Energy Efficient Lighting Sources and their Potential in Indoor Plant Cultivation," Renewable and Sustainable Energy Reviews, vol. 13, Issue 8, pp. 2175-2180, 2009.

R.M. Tomb et al., "New Proof-of-Concept in Viral Inactivation: Virucidal Efficacy of 405 nm Light Against Feline Calicivirus as a Model for Norovirus Decontamination," Food & Environmental Virology, vol. 9(2), 23 pages (2017).

A.J. DeLucca et al., "Blue Light (470 nm) Effectively Inhibits Bacterial and Fungal Growth," Letters in Applied Biology, vol. 55., pp. 460-466 (2012).

C.D. Ltyle et al., "Predicted Inactivation of Viruses of Relevance to Biodefense by Solar Radiation," J. Virology (vol. 79 (22), pp. 14244-52 (2005).

K. Bergmann, "UV-C Irradiation: A New Viral Inactivation Method for Biopharmaceuticals," America Pharmaceutical Review, vol. 17(6) (Nov. 2014).

Pinter, Matt, et al., "IEC/EN 62471 (Eye Safety) for LED Lighting Products—Standards for Eye and Skin Safety," Smart Vision Lights, 2009, 4 pages.

Neumark, et al., "Wide Bandgap Light Emitting Materials and Devices," John Wiley & Sons, 2008, 50 pages.

Dai, Tianhong, et al., "Blue Light for Infectious Diseases: Propionibacterium Acnes, Helicobacter Pylori, and Beyond?" National Institutes of Health—Drug Resist Update, Aug. 2012, 15(4), pp. 223-236.

Daicho, Hisayoshi, et al., "A Novel Phosphor for Glareless White Light-Emitting Diodes," Nature Communications, 3:1132, Oct. 16, 2012, 8 pages.

Setlur, Anant A., "Phosphors for LED-based Solid-State Lighting," The Electrochemical Society Interface, Winter 2009, 5 pages.

TRI-R Project Brochure, Toshiba Materials Co., LTD., retrieved on Aug. 18, 2017, 16 pages.

Extended European Search Report regarding corresponding EP Application No. 20201893.3, mailed Mar. 30, 2021.

Communication Pursuant to Article 94(3) EPC regarding corresponding European Patent Application No. 20201893.3, mailed Jan. 27, 2022.

Information Disclosure Statement filed in U.S. Appl. No. 18/045,707 on Oct. 11, 2022.

https://web.archive.org/web/20160717150658/http://vidashield.com/files/VidaShield-Trifold.pdf (brochure captured by WBM).

https://web.archive.org/web/20160804101125/http://vidashield.com/files/VS03.pdf (spec sheet captured by WBM), dated Jun. 25, 2016.

* cited by examiner

COMBINATION LED LIGHTING AND FAN APPARATUS

This application is a continuation of U.S. patent application Ser. No. 17/492,778 filed on Oct. 4, 2021 and which will issue as U.S. Pat. No. 11,608,974 on Mar. 21, 2023, which is a continuation of U.S. patent application Ser. No. 16/460,217 filed on Jul. 2, 2019, issued as U.S. Pat. No. 11,137,134 on Oct. 5, 2021, which is a continuation of U.S. patent application Ser. No. 15/991,038, filed May 29, 2018, issued as U.S. Pat. No. 10,337,716 on Jul. 2, 2019, which is a continuation of U.S. patent application Ser. No. 15/471,762, filed on Mar. 28, 2017, issued as U.S. Pat. No. 10,006,619 on Jun. 26, 2018, which claims priority from Provisional Patent Application Ser. No. 62/439,719 filed on Dec. 28, 2016.

FIELD OF THE INVENTION

The present invention relates to the combination of a fan and LED light system built into the footprint of an office ceiling tile. More particularly, the present invention provides for a troffer shell to house both the light and fan in a configuration to direct airflow across the LED light fixture and through an outlet. The present invention may utilize the fan blade technology disclosed in U.S. patent application Ser. Nos. 14/814,161, 15/043,923 and 15/346,913 each of which are incorporated herein by reference in their entirety.

BACKGROUND OF THE INVENTION

Indoor spaces such as offices, hospitals, educational institutions and the like have two main issues: (1) maintaining air quality and air movement; and (2) providing adequate and proper lighting. Indoor spaces often have only a single HVAC system that provides air and heat to all of the different sized offices or rooms within a space. Separately, the indoor space utilizes a series of LED lights that are mounted in ceiling tiles having a dimension of 2 ft.×2 ft. or 2 ft.×4 ft. There is a need for a system which can move air within an indoor space which supplements the primary HVAC system while at the same time providing ample lighting within the indoor space while fitting into the dimensions of a ceiling tile. The system also can provide a cooling effect on the LED lights to prolong the life-span of the lights.

Excessive heat causes damage to LED lights. LED bulbs that produce white light typically generate excessive heat that must be conducted away from the LED light system. Proper thermal management is critical to maintaining the original brightness and extending the lifespan of LED lights. Unfortunately, due to component costs, many manufacturers do not include the materials or structures necessary to provide proper heat transfer, thereby reducing the performance of the product. For example, most LED lighting manufacturers use less expensive and less reliable circuit boards that do not transfer heat well. Heat build-up in LED lights will damage the material, decrease the effectiveness of the light and decrease the lifespan of the lighting unit.

The secret to a successful LED fixture design is proper thermal management. There are several factors that affect the thermal performance of any fixture including the ambient air temperature, but LEDs specifically suffer from improper thermal design. The displacement of waste heat produced by LED lights is paramount to the longevity of the LED lights and can provide an advantage to a company in the emerging LED lighting industry.

The energy consumed by an incandescent bulb produces around 12% heat, 83% infrared radiation and only 5% visible light. A typical LED light produces 15% visible light and 85% heat. It is important to dissipate heat from LED's through efficient thermal management. The operating temperature of an LED light affects the life span of the LED. LED lights do not tend to fail catastrophically, instead the lumen output of the LED decreases over time. Elevated internal temperatures of the LED cause accelerated deterioration of the LED lights.

Further, in an office or indoor environment, the absence of adequate ventilation causes irritating or harmful contaminants to accumulate, which causes worker discomfort, health problems and reduced performance levels. Air purification is an important part of an HVAC system. A typical indoor HVAC system is not a substitute for source control or ventilation.

Thus, there is a need for combination fan and LED light fixture system that fits into the footprint of a typical ceiling tile.

SUMMARY OF THE INVENTION

The present invention relates to a combination of an LED light system and an axial or crossflow fan which is adapted to be inserted into a foot-print of a typical ceiling tile.

The present invention further utilizes a small flow fan that operates to propel air along the surface of an LED light system. In one embodiment, the fan is configured to intake cooler air from the lower portion of an office space through the ceiling fixture. Pushing relatively cooler air through the fixture causes convective heat transfer over the LED lights. The reduction in temperature has a significant impact on the life of the drive system of the fan, the lighting ballast and the LED components.

The present invention further includes an air diversion mechanism positioned in proximity to the fan to equally distribute the air propelled by the fan to all sides of the fixture. The air diversion mechanism provides equal distribution of the air throughout the fixture which provides for equal air movement and heat transfers across the LED lighting fixtures. The housing for the air dispersion system may also be used to house the ballast, drivers and wires of the lighting and fan systems.

The present invention combines the benefit of savings in electrical energy with savings in HVAC energy costs in one unit.

The present invention further includes the benefit of adapting the fan and LED lighting fixture to fit into the foot print of a ceiling tile to permit installation of the fixture in standard ceiling tile configurations, thus maintaining the aesthetics of the ceiling.

The present invention includes the benefit of moving air in an indoor space to provide more efficient heating of the indoor space.

The present invention may include the stepped fan blade technology of U.S. patent application Ser. Nos. 14/814,161, 15/043,923 and 15/346,913 which are all incorporated herein by references in their entirety. The stepped-fan blade technology provides the benefit of moving air through the fixture in a more efficient manner thereby reducing the amount of energy required to operate the unit. The stepped blade technology also enables the fan to operate at a lower speed thus utilizing less energy and reducing noise. Finally, the stepped-fan blade technology disperses the air in a uniform manner.

The present invention provides the additional benefit of enhancing the life of all of the electrical fixtures (both the lighting and fan fixture) by reducing the amount of deterioration on each fixture caused by heat.

The present invention will also enhance the foot-candles per watt performance of the lighting optics by reducing the temperature of the LED light. The present invention reduces the problem of the LED light degrading over time due to an increase in temperature.

This design of the present invention will also enhance the ability to self-clean the lens on the LED face by utilizing air to push any dust or debris away from the lighting fixture.

This design of the present invention provides for a competitive advantage in that it permits electrical hook up in one complete unit that used to require two separate electrical connections, one for the fan and one for the light.

An added benefit of the present invention provides for a filter to clean the air that comes through the perforations of the intake or the screen of the light fixture—therefore creating a cleaner air environment.

The present invention may utilize various color schemes in the troffer shell to impact various behavior traits of a person. Color is believed to profoundly affect the productivity of a person. Research has shown that blue color is believed to affect a person's mind; yellow is believed to affect a person's emotions; red is believed to affect a person's body; and green is believed to affect a person's balance. Utilizing these colors in the present invention, the colors can affect a person's behavior.

Finally, the present invention presents a benefit of elimination of any strobing effect caused by the fan blades interfering with the light distribution.

These and other objects and advantages of the present invention, as well as the details of the illustrative embodiment, will be more fully understood from the following specification and drawings.

BRIEF DESCRIPTION OF THE DRAWINGS

FIG. 9(*a*) is a perspective view of the fan grate depicted in FIG. 9;

FIG. 10(*a*) is a perspective view of the fan grate depicted in FIG. 10;

DETAILED DESCRIPTION OF THE PREFERRED EMBODIMENTS OF THE INVENTION

Figure 1:
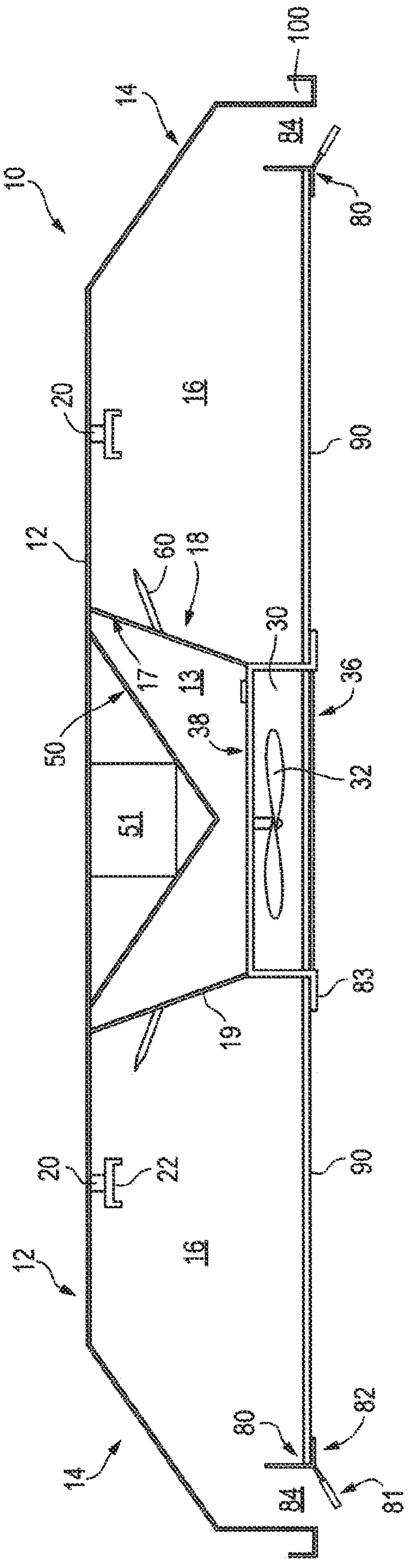
FIG. 1 is a sectional view of one embodiment of the combination light and fan fixture depicting a troffer shell.
Figure 2:
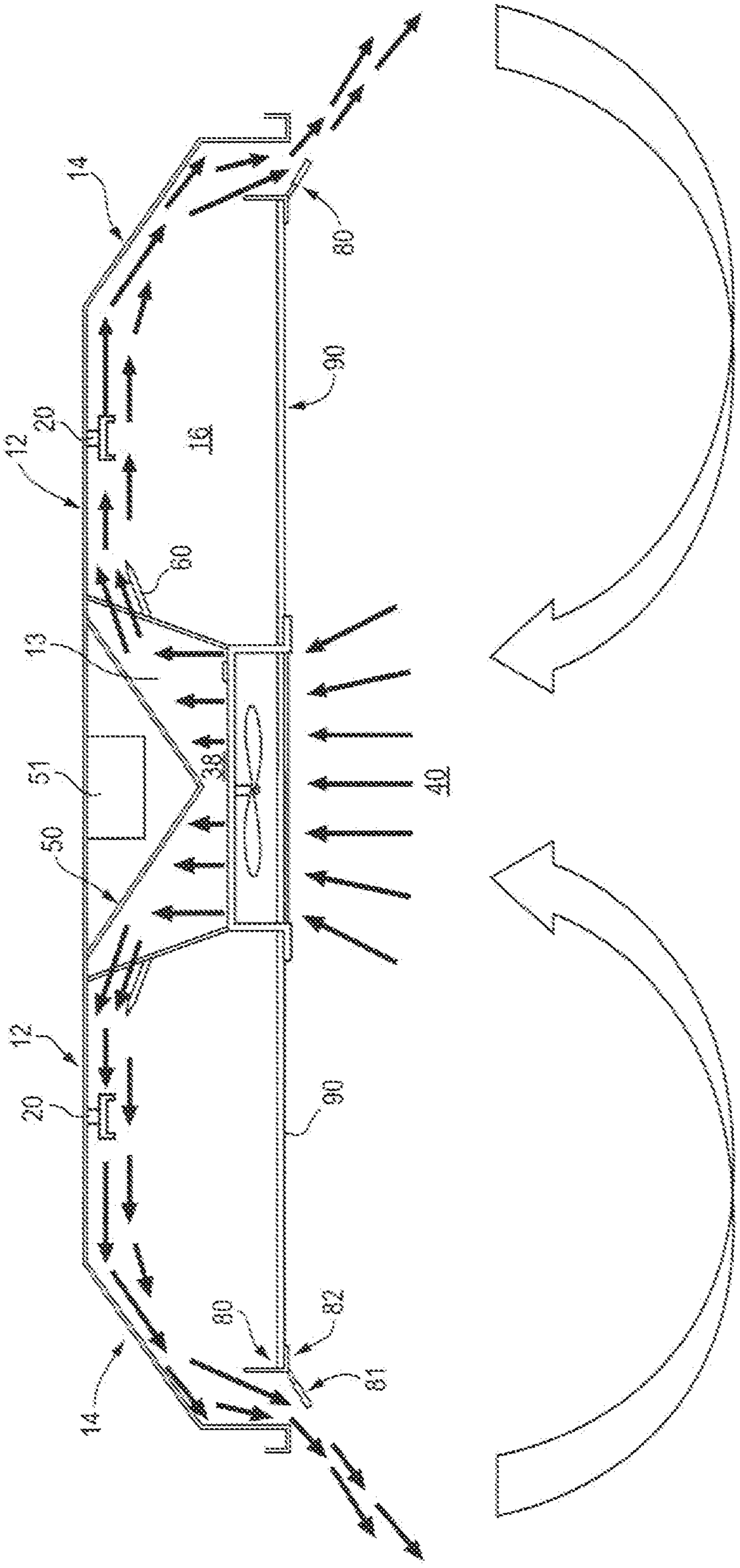
FIG. 2 is a sectional view of one embodiment of the combination light and fan fixture showing the flow of air.
Figure 3:
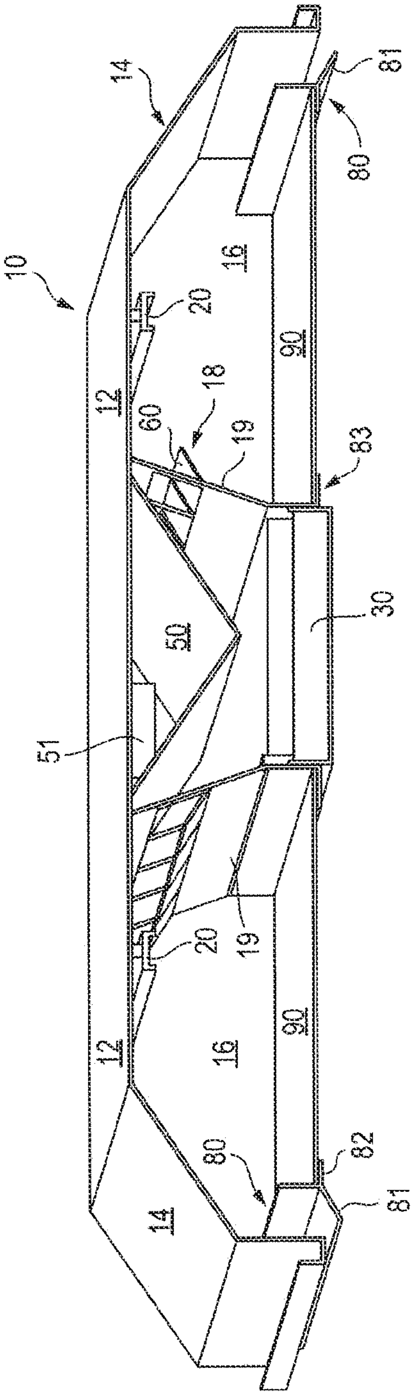
FIG. 3 is a prospective view of one embodiment of the combination light and fan fixture depicting a troffer shell.

A preferred embodiment of the present invention comprises a combination of a fan and LED light fixture. FIGS. 1 and 2 show side sectional views of an embodiment of the present invention depicting a troffer shell 12. FIG. 3 shows a perspective view of a preferred embodiment of the present invention including a troffer shell. The combination fan 10 includes a troffer shell 12 which supports at least one LED light fixture 20 and a fan 30. The fan 30 is supported by a louvered fan holder 18. As shown in FIG. 3, the louvered fan holder 18 has a lower solid portion 19 and an upper open portion 17 that includes several opening and louvers 60 which direct air from the fan chamber 13 along the troffer shell 12. The troffer shell 12 is the same dimensions as a ceiling tile typically 2 ft.×2 ft. or 2 ft.×4 ft. The LED light fixture 20 is preferably positioned along the periphery of the troffer shell 12 such that light from the fixture 20 is not interrupted by the fan 30. The LED light fixture includes an LED lamp 22. The LED light fixture 20 is preferably in the form of a strip which runs the length of the troffer shell 12.

Figure 12:
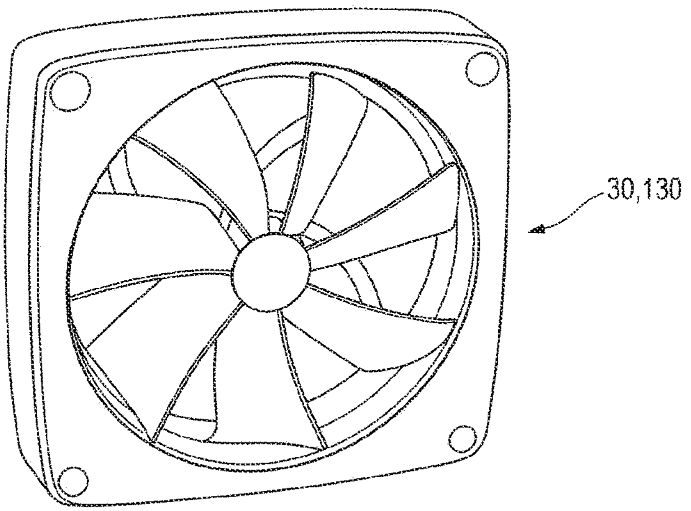
FIG. 12 is a perspective view of an axial fan of the present invention.

The fan 30 preferably includes at least an axial fan as shown in FIG. 12. There may be more than one fan within the fan area 13. The blades 32 of the axial fan 30 force air to move parallel to a shaft 34 about which the blades 32 rotate. Air flow 40 moves axially through the intake of the fan 36 and axially out through the outlet 38 of the fan 30. The flow of air is generally linear trough the intake 36 and the outlet 38. The design of the fan 30 is a function of the blade configuration 32 that creates a pressure of differential that produces airflow 40 across the fan blade 32. The axial fan 30 may consist of anywhere from 2 to 8 blades. The axial fan 30 is connected to a motor 51 and typically operates at high speeds. The typical speed of the axial fan of the present invention operates between 1800 to 4000 RPM to produce airflow in the range of 85 to 150 cubic feet per minute.

Figure 4:
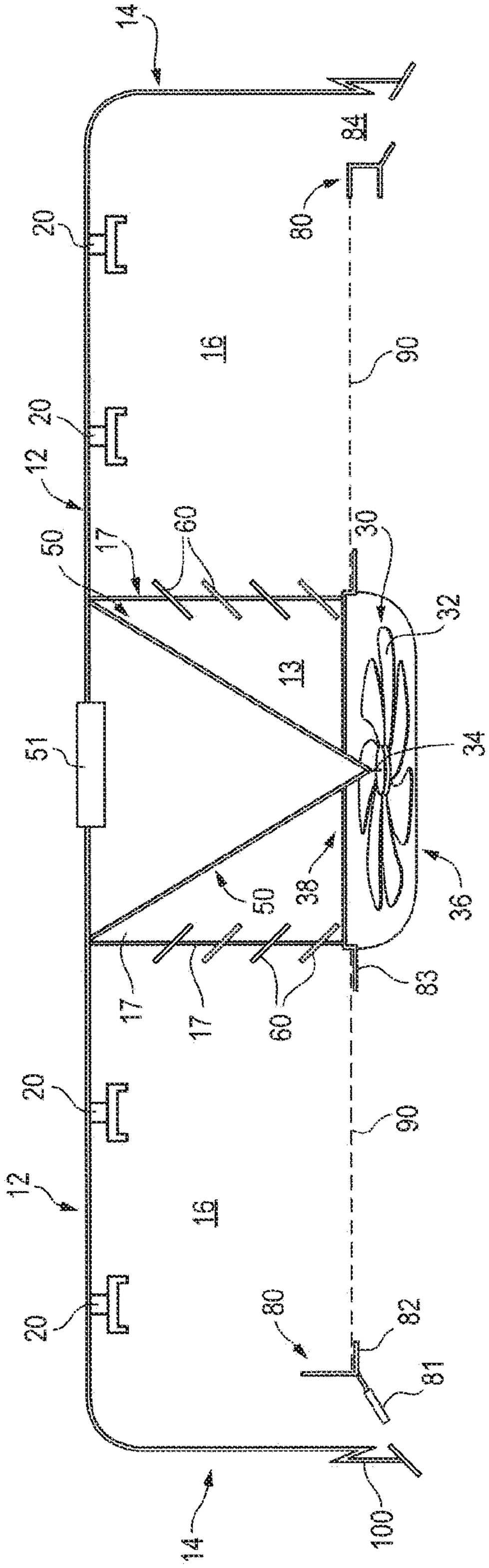
FIG. 4 is a sectional view of one embodiment of the combination light and fan fixture of another embodiment depicting an alternative embodiment of a troffered shell.

As shown in FIG. 2, The configuration of the troffer shelf 12 directs the flow of air from the outlet 38 of the fan 30. Air flows along the troffer shelf 12 and the troffer baffle 14, along the LED light fixture 20. Air passing along the LED light fixture 20 acts to dissipate heat produced by the LED light fixture 20 to reduce the operating temperature of the LED light fixture 20. In essence, the air flow reduces waste heat produced by the LED fixture 20 by conducting the heat away from the fixture 20. FIG. 4 depicts an alternative design of the troffer shelf and the troffer baffle 14. In the alternative design, air is propelled from the fan 30 into the fan chamber 13. The air from the fan 30 is deflected by a diversion mechanism 50, through the opening 17 and directed by louvres 60 into the troffer cavity 16. The louvres 60 are configured to direct the air from the fan along the troffer shell 12 and along the troffer baffles 14. By directing air from the fan 30 along the troffer shell 12 causes the air to circulate along LED light fixtures 20. The air flow helps to reduce the temperature of the LED light fixture 20. The air flow is directed by the troffer baffle through an exit vent 84 formed by the vent 81, the troffer baffle 14 and the lens bracket 80.

Figure 5:
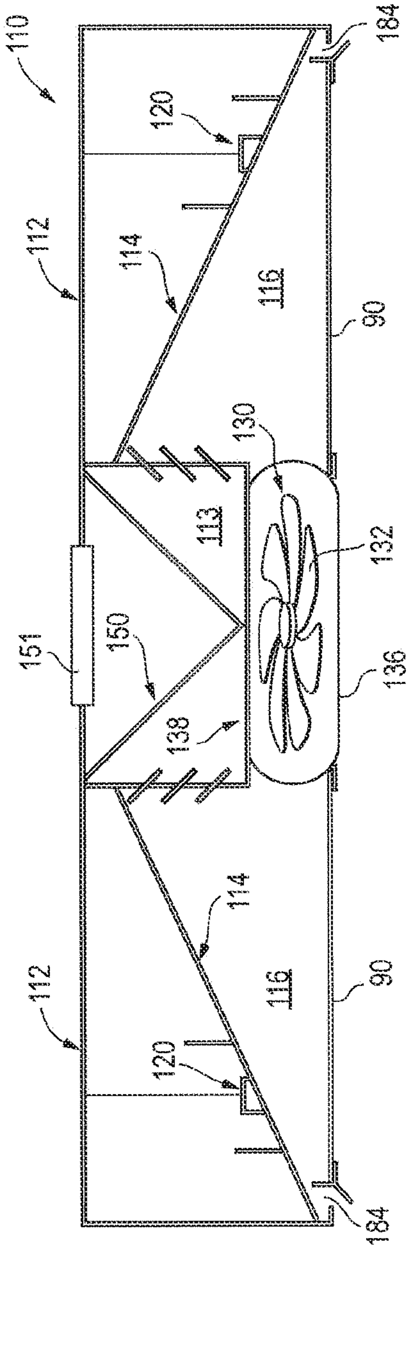
FIG. 5 is a sectional view of one embodiment of the combination light and fan fixture depicting an angled shell showing the flow of air.

In the preferred embodiments of the present invention, there may be a vent and lens bracket 80. The bracket 80 is affixed to the troffer shelf 12 in such a manner to permit air to flow from the troffer cavity 16 through an exit vent 84 formed by a vent 81 in the bracket 80. The vent 84 permits the air heated by LED light fixture 20 to exit the troffer cavity 16. The bracket 80 also includes a lens bracket 82. The lens bracket 82 corresponds with a fan lens bracket 83 to secure a lens 90 in place within the combination LED light and fan 10. The lens 90 provides a solid surface to assist with containing any air from the fan 30 such that it proceeds along the troffer shelf 12 and the troffer baffle 14 to the LED light fixture 20 and through the vent 84. A lens FIG. 5 is not necessary to the invention. However, the lens 90 typically made of a somewhat flexible translucent plastic material. There is a mounting mechanism 100 that is used to affix the combination LED light fixture and fan to an adjacent ceiling tile or bracket.

The embodiments of the present invention incorporate the use of color displayed by the lighting system to affect the environment in which the combination LED light and fan fixture 10 may be implemented. Research has shown that different colors appear to affect behavioral traits in humans. For example, the color yellow is believed to influence a person's self-confidence; the color red is believed to influence a person's physical body, the color blue is believed to influence a person's mind and the color green is believed to influence a person's emotional balance. It is believed that, for example, the combination of a yellow color with a blue color will stimulate a person's emotional balance and mind. The different color combinations may be incorporated into the present invention in numerous ways. In one embodiment of the present invention, the colors blue, red, yellow or green may be applied to the internal surface of the troffer shelf 12 and/or the troffer baffle 14 by means of paint, insert or other known technique. Alternatively, the lens 90 may comprise of the colors blue, red, yellow or green. The colored lens 90 operates to transmit light of the lens color in an indoor space. Finally, the LED light fixture 20 itself may be configured to generate light in the blue, red, yellow or green spectrums by means of the LED lamp 22.

The combination fan of the present invention may utilize the stepped-fan blade design depicted in the pending patent application Ser. Nos. 14/814,161, 15/043,923 and 15/346,913 incorporated herein by reference in the entirety. The benefits of the stepped-blade design are set-forth in detail in the pending patent applications referenced herein and need not be repeated in this provisional application and are not shown in the drawings. The stepped-fan blade design greatly improves the air flow characteristics of the fan 30.

Figure 9:
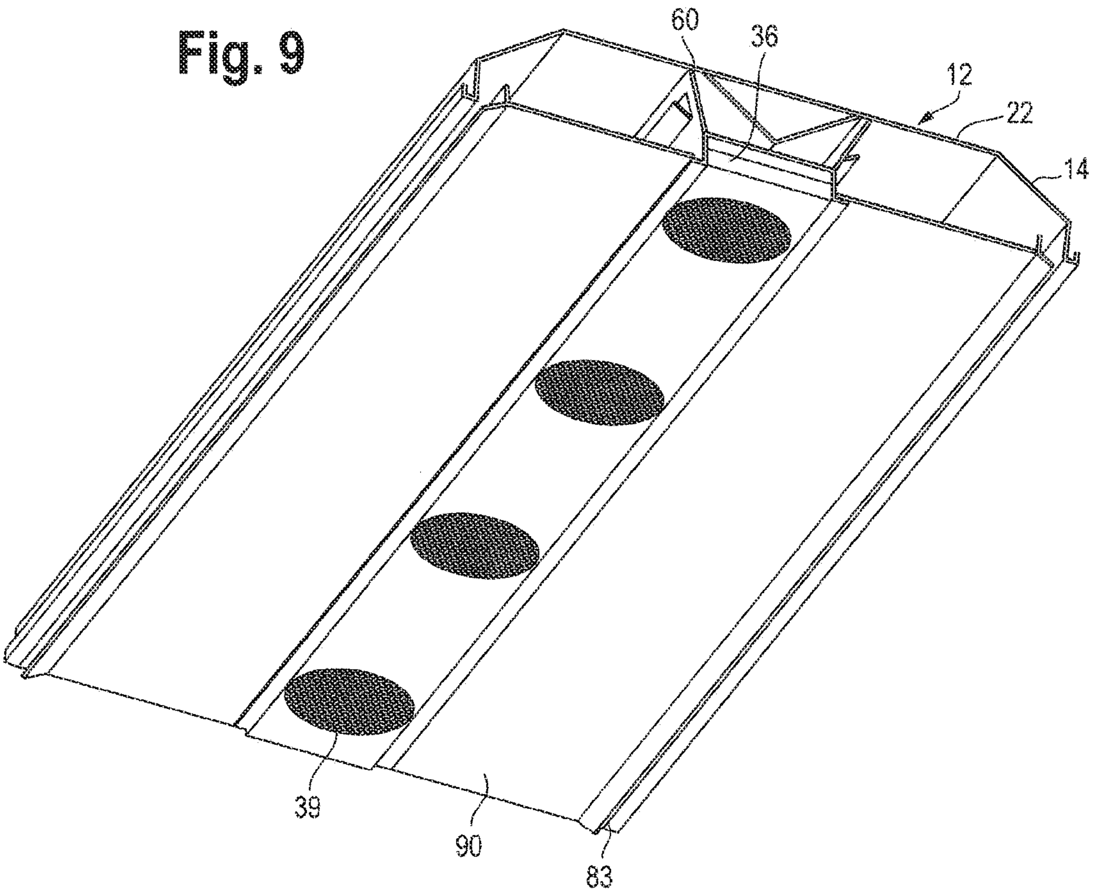
FIG. 9 is a perspective view of an embodiment of the present invention utilizing multiple round grills.
Figure 9A:
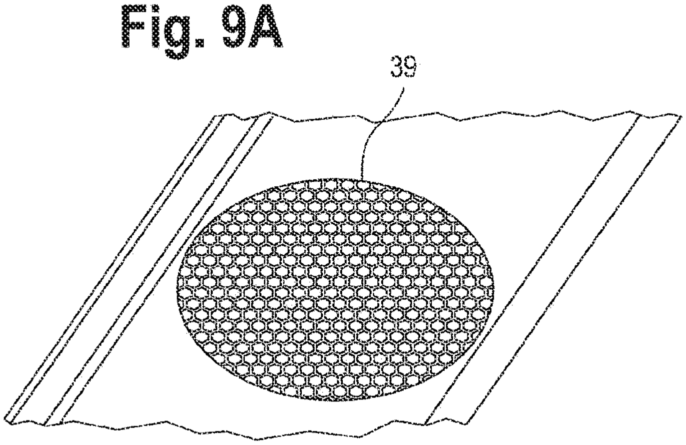
Figure 10:
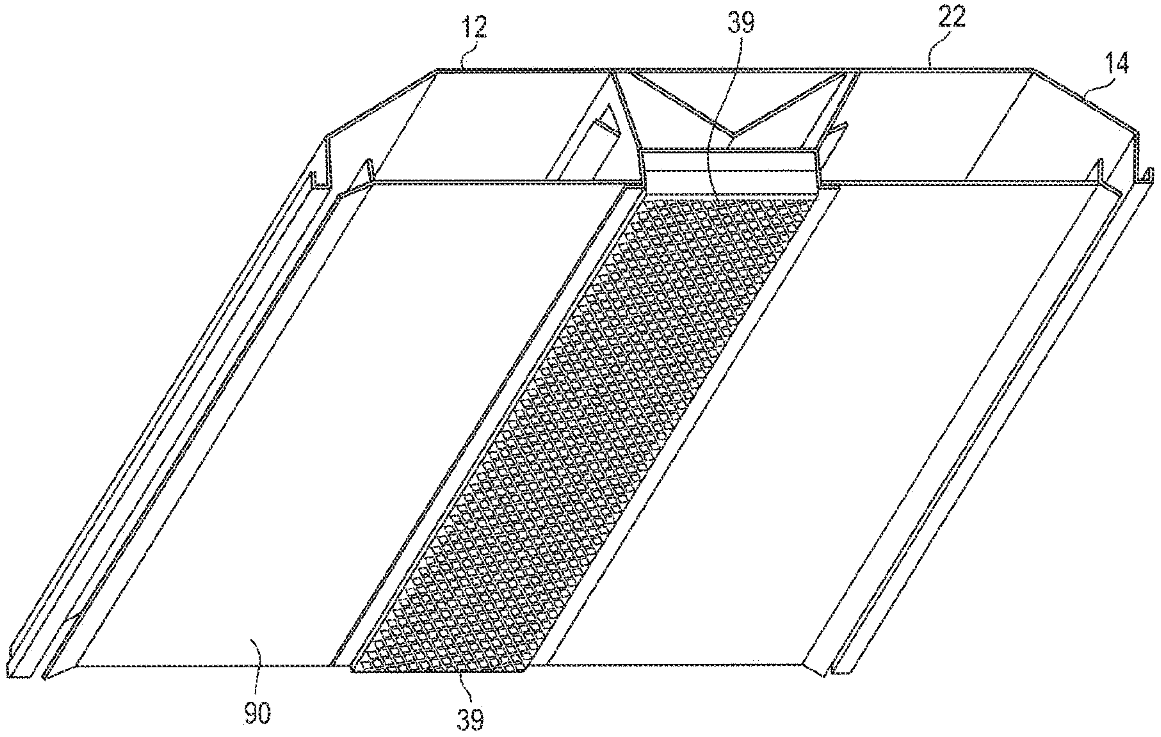
FIG. 10 is a perspective view of an embodiment of the present invention utilizing a single grill and lens.
Figure 10A:
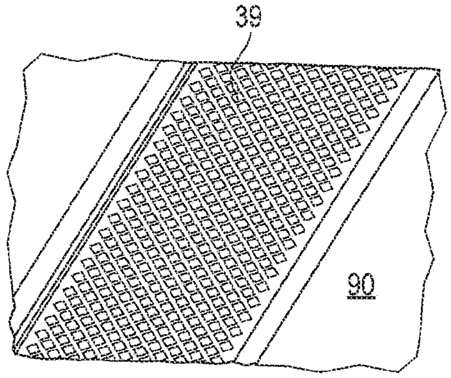

As shown in FIGS. 9, 9(*a*), 10 and 10(*a*), the fan intake 36 may include decorative perforations and/or a grill 39. The grills 39 may be of a circular configuration as shown in FIGS. 9 and 9(*a*). Alternatively, the grill 39 may extend the length of the fan intake 36 as shown in FIGS. 10 and 10(*a*). The air intake 36 may also include a filter (not shown). Alternatively, the filter may be positioned at the air outlet 38 or at a grill covering the combination fan 39. The filter serves to clean air flowing through the fan of dust and other fine particles. The filters may be removed for cleaning or replacement on a periodic basis. The embodiments shown in FIGS. 10 and 10(*a*) are more adapted to accommodate a filter.

Figure 8:
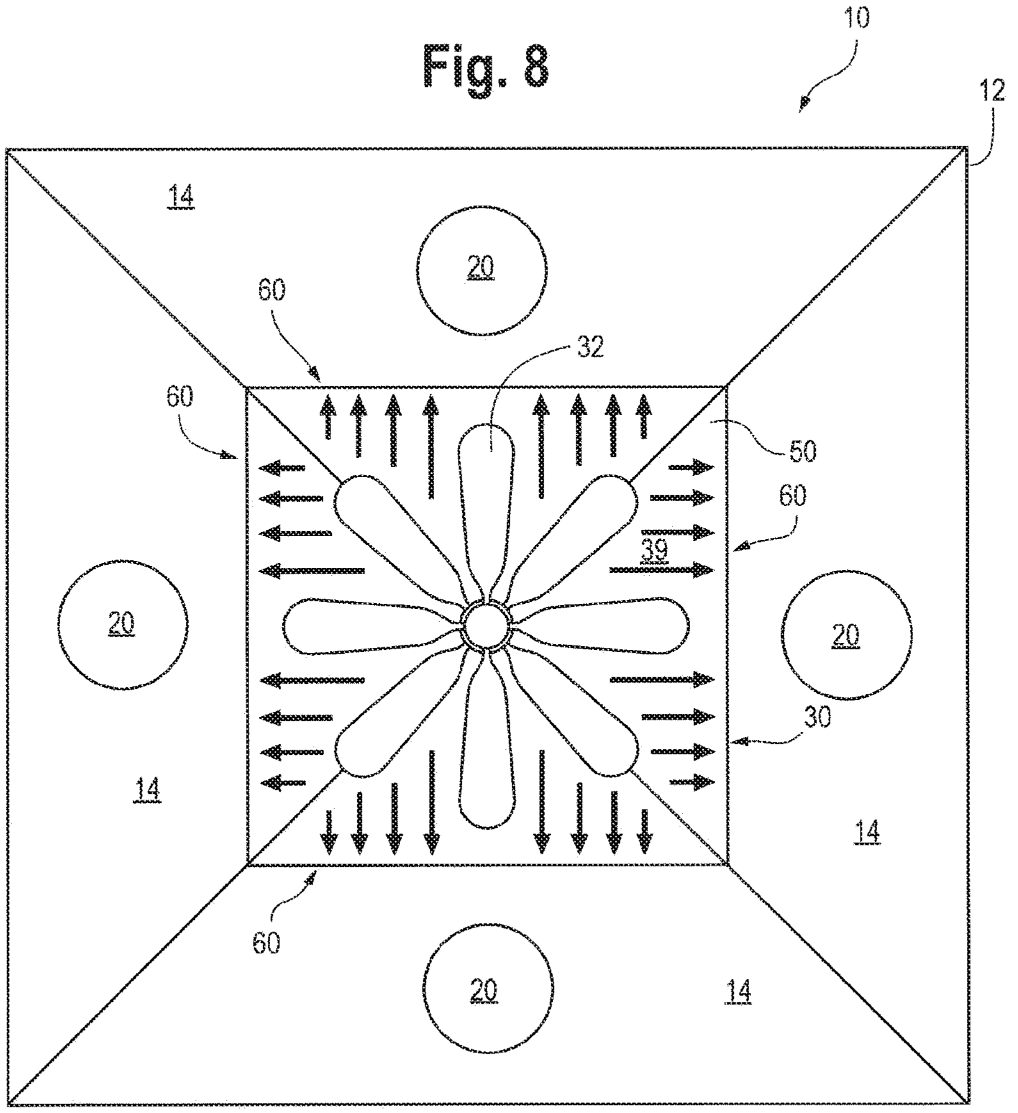
FIG. 8 is a bottom view of an alternative combination light and fan fixture having 4 LED lights.

The preferred embodiment of the combination fan and LED light system further includes an air diversion mechanism 50. The air diversion mechanism 50 is positioned within the cavity of the fan chamber 13. The physical configuration of the air diversion mechanism 50 is such that it directs air exiting the fan outlet 38 through the louvered openings 17 or diffuser in the louvered fan holder 18. In the preferred embodiment, the air diversion mechanism 50 is in the shape of a prism as shown in FIGS. 1 thru 7. Alternatively, the air diversion mechanism 50 may be in the shape of a pyramid (FIG. 8), cone, pentagon, triangle or other suitable shape to divert air from the fan chamber 13, through the openings 17 and into the troffer chamber 16 along the LED light fixture 20. The air diversion mechanism directs air towards opening 17 along louvered vents 60 positioned along the inside fan chamber 13. The vents 17 may include louvres 60 to assist in directing the air in the desired direction. Positioned within the air diversion mechanism 50 is a ballast housing 51 for LED lighting ballast, drivers and wires. The ballast housing 51 houses the wiring for both the LED lighting system and the fan to allow for a single hook-up to the electrical outlets or connections positioned within the ceiling.

The air exiting from the fan chamber 13 is directed along an airflow troffer shelf 12 to the troffer baffle 14. Air may alternatively be directed through a cooling chamber, which is not shown, but functions to cool the components located in the ballast housing 51, as well as, the LED lighting components.

The interior surface of the troffer shelf 12 and troffer baffle 14 are preferably coated with a Miro-Micro Matt wet paint produced by Alanod. The paint helps to maintain airflow along the surface, as well as, maintain a clean dust-free surface. The paint can be applied in any of the colors discussed above to affect the environment.

As shown in FIG. 2, air 40 enters the fan 30 and is expelled by the fan blades 32 into the fan chamber 13. Air flow in the fan chamber is generally laminar. Air is forced into the fan chamber 13 and is directed by a louvre 60 through an opening in the fan chamber 13 into the troffer cavity 16. The air (shown in arrows) has generally a laminar flow along the troffer shelf 12 and troffer baffle 14. As the flow of air from the fan 30 extends towards the exterior perimeter of the housing in the vent 84, the flow becomes more turbulent and mixes with the surrounding air such that the air exiting through the vent 81 is more turbulent in nature. The preferred direction of the air-flow is such that the intake 36 of the fan 30 draws air from the lower portion of a space and distributes the air along the upper portion of the space. Air along the lower portion of an area tends to be cooler than air that resides at the upper portion of an area. The cooler air is pulled into the fan 30 and distributed from the cavity is used to cool and clean the LED light fixture 20, the LED cover 24 and/or the LED light bulb 22. In an alternative embodiment, the direction of the airflow may be reversed.

Figure 6:
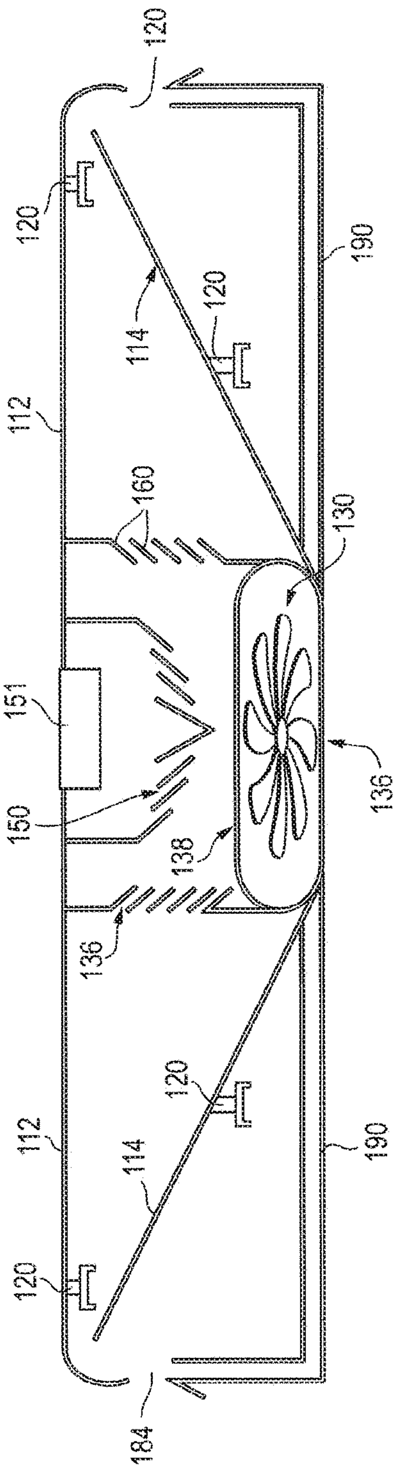
FIG. 6 is a sectional view of an alternative embodiment of the combination light and fan fixture depicting another embodiment of the angled deflection mechanism.
Figure 7:
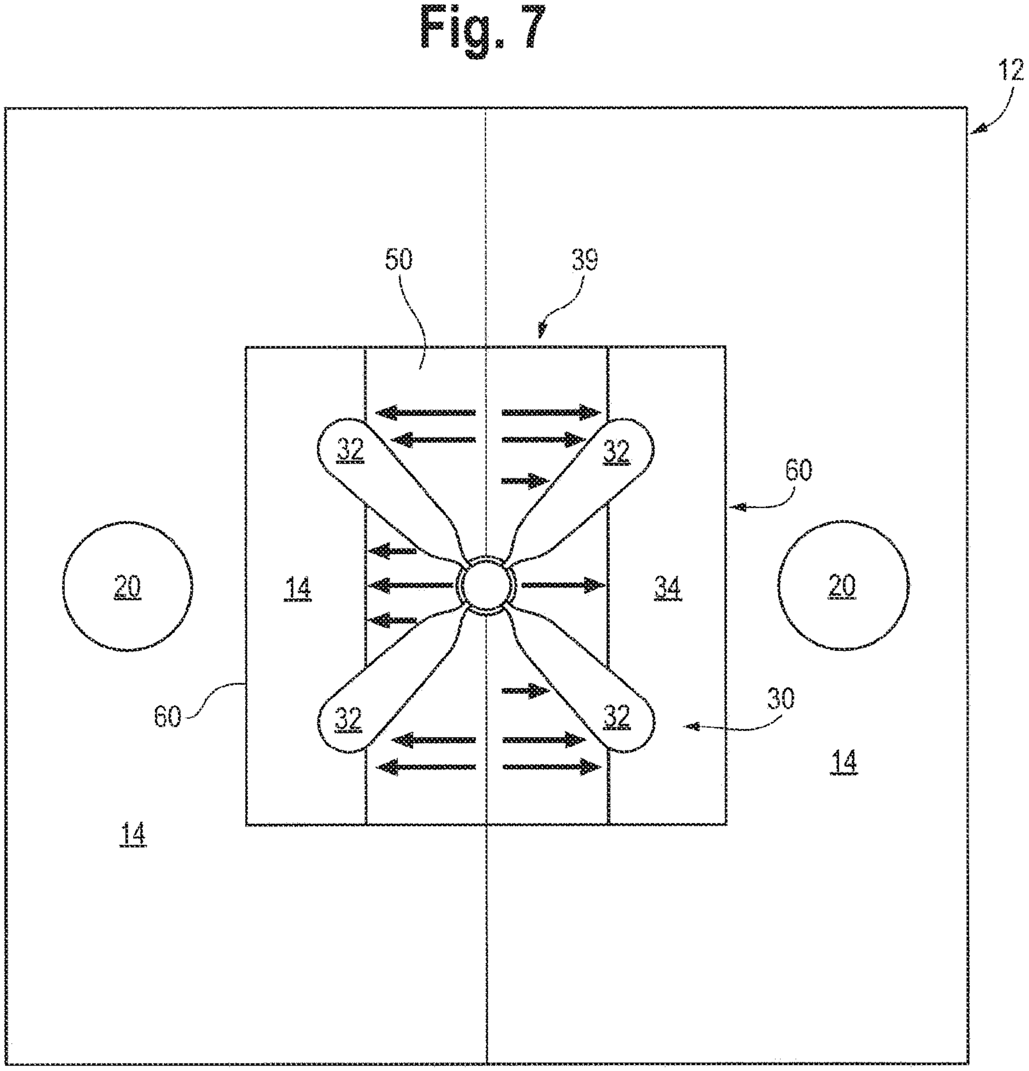
FIG. 7 is a bottom view of one embodiment of the combination light and fan fixture.

An alternative preferred embodiment of the present invention comprises a combination of a fan and LED light fixture. FIGS. 4, 5 and 6 show views of different embodiments of the present invention. As shown in FIGS. 5 and 6, the combination fan 110 includes a housing 112 which supports at least one LED light fixture 120 and a fan 130. The housing is the same dimensions as a ceiling tile typically 2 ft.×2 ft. or 2 ft.×4 ft. The LED light fixture 120 is preferably positioned along the periphery of the housing 112 such that light from the fixture 120 is not interrupted by the fan 130. The LED light fixture includes an LED light bulb 122.

The fan 130 preferably includes an axial fan. The blades 132 of the axial fan force air to move parallel to a shaft 134 about which the blades 132 rotate. The flow of air 140 is axially through the intake of the fan 136 and axially out through the outlet 138 of the fan 130. The flow of air is linear trough the intake 136 and the outlet 138. The design of the fan 130 is a function of the blade configuration 132 that creates a pressure of differential that produces airflow 140 across the fan blade 132. The axial fan 130 may consist of anywhere from 2 to 8 blades. The axial fan 130 is connected to an energy source (not shown) and typically operates at high speeds. The typical speed of the axial fan of the present invention operates between 1800 to 4000 RPM to produce airflow in the range of 85 to 150 cubic feet per minute. The combination fan of the present invention may utilize the stepped-fan blade design depicted in the pending patent applications referenced above.

The fan intake 136 may include decorative perforations and/or a grill 39 as shown in FIGS. 9 and 10. The air intake 136 may also include a filter (not shown). Alternatively, the filter may be positioned at the air outlet 138 or at a screen covering the combination fan 142. The filter serves to clean air flowing through the fan of dust and other fine particles.

The preferred embodiment of the combination fan and LED light system 110 further includes an air diversion mechanism 150. The air diversion mechanism 150 is positioned within the fan chamber 113 of the fan 130. In the preferred embodiment, the air diversion mechanism 150 is in the shape of a prism as shown in FIGS. 5 and 6. Alternatively, the air diversion mechanism 150 may be in the shape of a pyramid (FIG. 7), cone, pentagon, triangle or other suitable shape to divert air to the LED components and into the office space. The air diversion mechanism 150 directs air towards vents 117 positioned along the fan cavity 113. The vents 117 may include louvres 160 to assist in directing the air in the desired direction. Additionally, the air diversion mechanism may have vents to permit a portion of the air circulated by the fan to enter the diversion mechanism 150 to provide a cooling effect on the ballast housing 151.

The air exiting from the fan cavity 116 is directed along an airflow surface on the lower housing 114 air may alternatively be directed through a cooling chamber, which is not shown but functions to cool the fan components, as well as, the LED lighting components. The internal surface of the lower housing 114 is preferably coated with a Miro-Micro Matt wet paint produced by Alanod. The paint helps to maintain airflow along the surface, as well as, maintain a clean dust-free surface. The airflow 140 has two general components. The air that exits the fan cavity 113 generally has a laminar flow along the airflow surface of the lower housing portion 114. As the flow of air from the fan 130 extends towards the exterior perimeter of the housing 112 through the vent 184, the flow becomes more turbulent and mixes with the surrounding air. The preferred direction of the air-flow is such that the intake 136 of the fan 130 draws air from the lower portion of a space and distributes the air along the upper portion of the space. Air along the lower portion of an area tends to be cooler than air that resides at the upper portion of an area. The cooler air is pulled into the fan 130 and distributed from the cavity is used to cool and clean the LED light fixture 120, and/or the LED light bulb 122.

Figure 11:
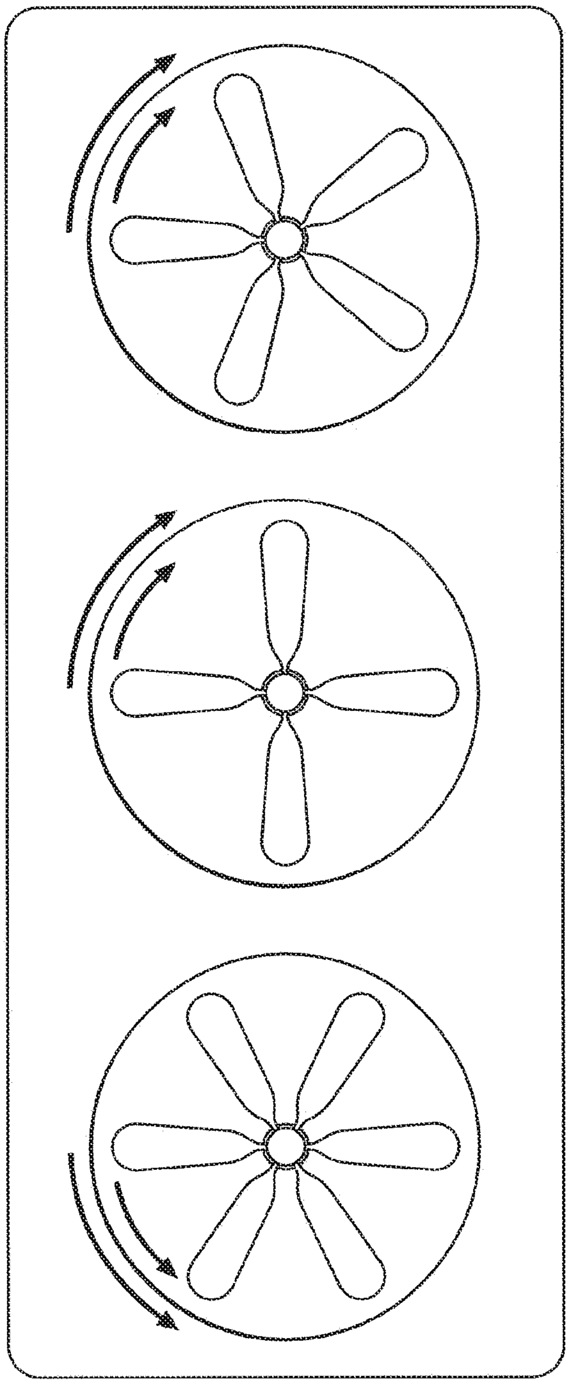
FIG. 11 is a view of the present invention incorporating multiple fan blades.

As shown in FIG. 11, the combination fan may include two or more fans 30. In the multiple fan configuration, it is beneficial that adjacent fans rotate in different directions to provide a more even distribution of air along the fan 30. It is important to note that the adjacent fans rotate in opposite directions.

FIG. 12 depicts the typical axial fan 30 and 130 that is used in the invention.

It should be understood that there are many components to the inventions of the combined fan. While specific combinations of elements are disclosed in specific embodiments, it should be understood that any combination of the different features may be utilized in the combined fan.

The foregoing disclosure and description of the invention are illustrating and explanatory thereof, and various changes in the size, shape and materials as well as in the details of illustrated construction may be changed without departing from the spirit of the invention.

It is understood that the invention is not limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An air movement and recirculation device comprising:

a housing configured to fit into a ceiling, said housing including a fan chamber, an outlet of a fan positioned adjacent the fan chamber, a cooling chamber positioned adjacent the fan chamber, and an air chamber positioned in the housing;

a first fan positioned in the housing adjacent the outlet of the fan wherein the fan rotates in a first direction to generate an air flow into the fan chamber, the fan aligned with a fan intake grill in the housing;

an air diversion mechanism affixed to the housing in proximity of the outlet of the fan wherein the air diversion mechanism includes a first openings configured to divert a portion of the air exiting the fan chamber into the air chamber and a second opening configured to divert a portion of the air exiting the fan chamber into the cooling chamber;

an LED light fixture having a determined temperature affixed to the housing and positioned in the air chamber wherein a portion of the LED light fixture is positioned within the housing to direct a flow of the air from the fan chamber such that the flow of air operates to cool the LED light fixture; and a ballast housing having a determined temperature affixed to the housing and containing components to operate the fan and the LED light fixture, wherein the ballast housing is positioned in the cooling chamber such that the flow of air from the fan chamber operates to cool the ballast housing.

2. The air movement and recirculation device of claim 1, wherein the housing has the dimensions of a ceiling tile.

3. The air movement and recirculation device of claim 1, wherein the housing has a length and a width in the dimensions of a ceiling tile, wherein the width is 2 feet, and the length is 4 feet.

4. The air movement and recirculation device of claim 1, further comprising at least one louvre positioned between the fan chamber and the air chamber configured to direct air from the fan chamber to the air chamber.

5. The air movement and recirculating device of claim 1, further comprising a plurality of louvres positioned between the fan chamber and the air chamber configured to direct air from the fan chamber to the air chamber.

6. The air movement and recirculating device of claim 1, wherein the air diversion mechanism is configured in a pyramidal shape.

7. The air movement and recirculating device of claim 1, wherein the air diversion mechanism is configured in a cone shape.

8. The air movement and recirculating device of claim 1, wherein the air diversion mechanism is configured in a triangular shape.

9. The air movement and recirculation device of claim 1, wherein the air chamber is completely coated with a miro-micro matt coating.

10. The air movement and recirculating device of claim 9, further comprising a ceiling tile configured to attach to the housing wherein the ceiling tile has an air intake grill.

11. The air movement and recirculating device of claim 10, wherein the air intake grill of the ceiling tile includes decorative perforations.

12. An air movement and recirculation device comprising:

a housing adaptable to be mounted in a ceiling tile grid;

a ceiling tile material secured to the housing, said ceiling tile material is configured to include an air intake grill in the ceiling tile material and a vent in the ceiling tile material;

a troffer shell affixed to the housing configured to create fan chamber, a troffer cavity and a cooling chamber wherein the troffer cavity is aligned with the vent of the ceiling tile material;

a fan affixed to the housing, the fan aligned with the air intake grill of the ceiling tile material and the fan having a fan outlet;

an air diversion mechanism positioned at the outlet of the fan, wherein the air diversion mechanism is configured to include a first plurality of openings configured to divert a portion of the air exiting the fan outlet into the troffer cavity and a second plurality of openings configured to divert a portion of the air exiting the fan outlet into the cooling chamber;

an LED light fixture having a determined temperature, positioned in the ceiling tile material and configured such that a portion of the LED light fixture is located in the troffer cavity whereby the air directed form the fan outlet into the troffer cavity passes the portion of the LED light fixture located in the troffer cavity thereby reducing the temperature of the LED light fixture; and a ballast housing having a determined temperature, positioned in the cooling chamber and configured such that a portion of the air entering the cooling chamber from the fan chamber passes the ballast housing thereby reducing the temperature of the ballast housing.

13. The air movement and recirculation device of claim 12, further comprising a second LED light fixture positioned in the ceiling tile material and affixed to the housing.

14. The air movement and recirculation device of claim 12, wherein the air diversion mechanism is configured in a pyramidal shape.

15. The air movement and recirculating device of claim 12, wherein the air diversion mechanism is configured in a cone shape.

16. The air movement and recirculating device of claim 12, wherein the air diversion mechanism is configured in a triangular shape.

17. The air movement and recirculating device of claim 12, wherein the air diversion mechanism is configured in a hexagonal shape.

18. The air movement and recirculating device of claim 12, wherein the ballast housing encompasses the components to operate the LED light fixture and the fan.

* * * * *